(12) United States Patent
Rick et al.

(10) Patent No.: US 8,408,587 B2
(45) Date of Patent: Apr. 2, 2013

(54) DASHBOARD SUPPORT PART HAVING FLAP CONFIGURATION

(75) Inventors: Ulrich Rick, Roxheim (DE); Udo Wagner, Ruesselsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 83 days.

(21) Appl. No.: 12/680,466

(22) PCT Filed: Jul. 17, 2008

(86) PCT No.: PCT/EP2008/005838
§ 371 (c)(1),
(2), (4) Date: Mar. 26, 2010

(87) PCT Pub. No.: WO2009/043400
PCT Pub. Date: Apr. 9, 2009

(65) Prior Publication Data
US 2010/0219618 A1    Sep. 2, 2010

(30) Foreign Application Priority Data
Sep. 27, 2007  (DE) .......................... 10 2007 046 155

(51) Int. Cl.
*B60R 21/215* (2011.01)
*B60R 21/205* (2011.01)
(52) U.S. Cl. ..................................... 280/728.3; 280/732
(58) Field of Classification Search ............... 280/728.2, 280/728.3, 732
See application file for complete search history.

(56) References Cited

U.S. PATENT DOCUMENTS

| 4,893,833 | A | * | 1/1990 | DiSalvo et al. ............... 280/732 |
| 5,238,264 | A | * | 8/1993 | Barnes .......................... 280/732 |
| 5,275,432 | A | * | 1/1994 | Pray et al. .................. 280/728.2 |
| 5,320,381 | A | * | 6/1994 | Barnes et al. .............. 280/728.3 |
| 5,398,959 | A | * | 3/1995 | Avila .......................... 280/728.3 |
| 5,427,409 | A |   | 6/1995 | Henseler et al. |
| 5,447,327 | A |   | 9/1995 | Jarboe et al. |
| 5,460,402 | A | * | 10/1995 | Rhodes, Jr. ................ 280/728.3 |
| 5,590,901 | A | * | 1/1997 | MacGregor ................ 280/728.3 |
| 5,615,908 | A | * | 4/1997 | Phillion et al. ............. 280/728.3 |

(Continued)

FOREIGN PATENT DOCUMENTS

| DE | 4105028 A1 | 3/1992 |
| DE | 4311241 C1 | 4/1994 |

(Continued)

OTHER PUBLICATIONS

China Patent Office, Chinese Office Action for Application No. 200880109225.3, dated Jun. 24, 2011.

(Continued)

*Primary Examiner* — Joseph Rocca
(74) *Attorney, Agent, or Firm* — Ingrassia Fisher & Lorenz, P.C.

(57) ABSTRACT

A dashboard support part is provided for fastening on a dashboard of a motor vehicle, having an airbag exit opening for unfolding a passenger airbag, and a flap configuration, which is hinged on the dashboard support part and closes the airbag exit opening. The dashboard support part has a depression, in which the flap configuration is received. The flap configuration comprises a separate flap, which closes the entire airbag exit opening, is only connected to the dashboard support part along a hinge line, and rests in the depression along its remaining circumference.

16 Claims, 2 Drawing Sheets

U.S. PATENT DOCUMENTS

| | | | | |
|---|---|---|---|---|
| 5,961,142 A | * | 10/1999 | Shiraki et al. | 280/728.3 |
| 6,045,153 A | | 4/2000 | Sommer et al. | |
| 6,070,901 A | | 6/2000 | Hazell et al. | |
| 6,082,760 A | * | 7/2000 | Ukai et al. | 280/728.3 |
| 6,447,004 B1 | * | 9/2002 | Kawakubo et al. | 280/728.3 |
| 6,457,739 B1 | * | 10/2002 | Dailey et al. | 280/728.3 |
| 6,644,685 B2 | * | 11/2003 | Sun et al. | 280/728.3 |
| 6,726,239 B1 | * | 4/2004 | Teranishi et al. | 280/728.3 |
| 6,908,521 B2 | | 6/2005 | Ponthieu | |
| 7,165,781 B2 | | 1/2007 | Cesar | |
| 7,237,767 B2 | | 7/2007 | Sakakibara et al. | |
| 2005/0087963 A1 | * | 4/2005 | Dailey et al. | 280/728.3 |
| 2005/0167958 A1 | * | 8/2005 | Okada et al. | 280/732 |
| 2007/0152429 A1 | * | 7/2007 | Dailey et al. | 280/728.3 |
| 2007/0246918 A1 | * | 10/2007 | Speelman et al. | 280/728.3 |

FOREIGN PATENT DOCUMENTS

| | | | |
|---|---|---|---|
| DE | 4306149 A1 | | 9/1994 |
| DE | 4315853 A1 | | 11/1994 |
| DE | 4420929 A1 | | 8/1995 |
| DE | 19505214 A1 | | 8/1996 |
| DE | 19948125 A1 | | 4/2000 |
| DE | 102004051877 A1 | | 6/2005 |
| DE | 60300905 T2 | | 6/2006 |
| EP | 0363986 A2 | | 4/1990 |
| EP | 0684168 A1 | | 11/1995 |
| EP | 0715992 A1 | | 6/1996 |
| EP | 0911225 A2 | | 4/1999 |
| EP | 1380477 A1 | * | 1/2004 |
| WO | 03033313 A1 | | 4/2003 |

OTHER PUBLICATIONS

International Searchin Authority, International Search Report for Application No. PCT/EP2008/005838, dated Oct. 16, 2008.

* cited by examiner

DASHBOARD SUPPORT PART HAVING FLAP CONFIGURATION

CROSS-REFERENCE TO RELATED APPLICATIONS

This application is a U.S. National-Stage entry under 35 U.S.C. §371 based on International Application No. PCT/EP2008/005838, filed Jul. 17, 2008, which was published under PCT Article 21(2) and which claims priority to German Application No. 102007046155.2, filed Sep. 27, 2007, which are all hereby incorporated in their entirety by reference.

TECHNICAL FIELD

The present invention relates to a dashboard support part for fastening on a dashboard of a motor vehicle having an airbag exit openings for unfolding a passenger airbag and a flap configuration, which closes the airbag exit opening.

BACKGROUND

To increase the passive safety of a passenger of a motor vehicle, situating a passenger airbag in the area of the dashboard, which unfolds in case of a collision and thus catches the passenger, who is displaced forward under inertial forces, is known. The passenger airbag is situated in the folded state on a side of the dashboard facing away from the passenger compartment and exits through an airbag exit openings into the passenger compartment if needed. For aesthetic reasons and to protect the airbag from damage and environmental influences, the airbag exit opening is closed and is only open by the unfolding thereby.

For example, flap configurations having separate flaps, i.e., flaps which are externally visible to the occupants, which are fastened on the dashboard or a passenger airbag module and are pressed out by the unfolding air bag, are known for this purpose from DE 4315853 C2 and EP 0363986 A2.

Alternatively thereto, integrated flap configurations, i.e., which are not visible to the occupants, are known for this purpose.

For example, DE 43 11 241 C1 proposes implementing the flap configuration in one piece with the dashboard surrounding it and implementing intended breakpoints connected by webs through corresponding punching or cutting procedures.

Alternatively, DE 43 06 149 A1 and DE 44 20 929 A1 propose a dashboard support part, which is fastened on the dashboard using screws and encloses an airbag exit opening, which is closed by the flaps connected to the dashboard support part, like a frame.

The particular two flaps of the flap configuration are connected along intended breakpoints by a cover film and along a hinge line to the dashboard support part. This solution requires a relatively high force to open the flaps of the flap configuration. This can have the result that the correspondingly accelerated flaps hit a windshield of the motor vehicle with a high impulse and damage it, which can in turn result in damage of the airbag.

In order to avoid this, for example, DE 41 05 028 A1 proposes providing the flaps of the flap configuration with a cushion. However, like the solution proposed in DE 44 20 929 A1 and DE 43 06 149 A1, this requires a relatively high wall thickness of the flap configuration, connected to a correspondingly high weight.

At least one object of the present invention is therefore to provide a dashboard support part having a flap configuration for closing an airbag exit opening, in which the danger of damage of the windshield is reduced. In addition, other objects, desirable features, and characteristics will become apparent from the subsequent summary and detailed description, and the appended claims, taken in conjunction with the accompanying drawings and this background.

SUMMARY

A dashboard support part according to an embodiment of the present invention is provided for fastening on a dashboard of a motor vehicle. The fastening can either be performed removably, for example, using screwing and/or locking, or permanently, for example, by riveting, gluing, and/or welding. The dashboard support part can also be implemented integrally, in particular in one piece with the dashboard.

An airbag exit opening is provided in the dashboard support part, which is preferably enclosed by the dashboard support part like a frame, and through which an unfolding passenger airbag can exit into a passenger compartment. When the passenger airbag is stowed, the airbag exit opening is closed by a flap configuration, which is hinged on the dashboard support part and can be opened by the unfolding passenger airbag.

According to an embodiment of the invention, the dashboard support part has a depression in which the flap configuration is received. The flap configuration comprises a single, separate flap which closes the entire airbag exit opening and is only connected to the dashboard support part along a hinge line, while it rests in the depression along its remaining circumference.

Because the flap only rests in the depression along its remaining circumference and is thus positively supported on the dashboard support part, the forces required for opening the flap may be reduced and the danger of damage of a windshield, the dashboard, or the like may thus be decreased. Such low opening forces may advantageously also be implemented by smaller gas generators and less rigid airbags.

The positive contact of the flap in the depression simultaneously reliably prevents unintended movement of the flap, in particular indentation in the direction of the passenger airbag, however.

A flap configuration is thus provided according to an embodiment of the invention which reliably protects the passenger airbag and can nonetheless be opened using low forces. A further advantage is that the dashboard support part according to an embodiment of the invention having the flap configuration fastened thereon can be produced simply.

Because of the support, the hinge mechanism in particular, using which the flap is fastened on the dashboard support part and the flap itself can be implemented having lower rigidity and thus having lower weight, which further reduces the opening forces.

With a correspondingly thin and thus flexible flap, the hinge mechanism can particularly be formed by the flexibility of the flap itself, which may be bent away from the airbag exit opening with elastic or plastic deformation in its area not connected to the dashboard support part. Through the implementation of the flap configuration using a single flap, which is only connected to the dashboard support part along its hinge line, geometrically simpler flap contours are additionally possible, which advantageously reduces development costs and increases the reliability of an airbag system.

The flap can be removably fastened on the dashboard support part, in particular by screwing and/or locking. A replacement of the flap is thus advantageously possible, in particular if it has been plastically deformed by the opening passenger airbag as it folds away.

Alternatively thereto, the flap can be permanently fastened on the dashboard support part, in particular by welding, gluing, and/or riveting. This allows a particularly simple and reliable connection with little installation effort.

As already described above, the hinge mechanism, via which the flap is connected to the dashboard support part, can be implemented by elastic deformation of a flap which is preferably implemented as elastic for this purpose, in particular having low material thickness. In particular, the flap can have a material thinning in the area of a desired hinge line. However, other hinges, such as film hinges are also equally possible, which may be implemented by fastening appropriately flexible textile, metal, or plastic films on the dashboard support part and the flap.

In a preferred embodiment, a layer is provided which covers the flap configuration and the dashboard support part in one piece, in particular using a continuous surface, so that the flap configuration is not visible to the occupants. The layer can preferably have material thinning areas along the circumference of the flap, preferably on a side facing away from the passenger compartment, so that the layer tears there upon opening of the flap and exposes the airbag exit opening. The layer situated on the flap configuration and the dashboard support part surrounding it like a frame not only conceals the flap configuration in an aesthetically advantageous manner, but rather may additionally bias tension the flap configuration against its contact in the depression of the dashboard support part and thus prevent flapping of the flap configuration.

Furthermore, the layer can comprise one or more plastic foams, one or more films, and/or one or more foam films. A plastic foam is preferably situated directly on the flap configuration and the dashboard support part, in order to cushion these parts in relation to the passenger compartment. A film can advantageously be situated on top, in order to design the passenger compartment so it is aesthetically appealing and to prevent damage of the preferably soft plastic foam.

The layer can preferably also be fastened to the dashboard support part in one piece, in particular having a continuous surface which entirely or partially covers the dashboard. This provides a dashboard having the most continuous surface possible, which is less susceptible to soiling and can be cleaned more easily. Furthermore, the layer can also only be situated on the dashboard support part and the flap configuration, so that after an activation of the passenger airbag only the dashboard support part must be replaced and a coating of the dashboard remains undamaged.

As previously noted, it is advantageous, in particular to implement the hinge mechanism and to reduce the weight, to implement the flap having a low wall thickness. However, because a single flap covers the entire airbag exit opening according to an embodiment of the invention, it can be advantageous to provide a stiffening structure, in particular a rib structure, on the flap, in particular in an area adjoining the hinge line, in order to prevent unintentional indentation of the flap in the direction of the passenger airbag. This stiffening structure is advantageously implemented on the side of the flap facing away from the passenger compartment, so as not to impair the surface facing toward the passenger compartment. Additionally or alternatively, stiffening structures may also be provided in the flap, for example, using embedded reinforcements made of metal, glass fibers, or carbon fibers.

The depression in which the flap is situated is preferably situated on a side of the dashboard support part facing toward the passenger compartment and thus allows opening of the flap using lower forces while lifting the flap off of the dashboard support part into the passenger compartment.

The depression in which the flap is situated preferably essentially corresponds to its external contours, so that only a small gap results between dashboard support part and flap received therein. A side of the flap facing toward the passenger compartment can advantageously be flush with the surface of the dashboard support part.

The external contour of the flap preferably essentially corresponds to the airbag exit opening and only slightly overlaps it along its circumference, so that the flap has the least possible mass moment of inertia and correspondingly small forces are required for opening.

The hinge line, along which the flap is connected to the dashboard support part, can preferably be situated on a side of the dashboard support part facing away from a windshield of the motor vehicle, so that the flap folds away from the windshield and does not damage it upon opening. In order to avoid impairment of the foot well in front of the dashboard due to the flap folding out and in particular partially guide the unfolding air bag, the hinge line can also be oriented differently, however, in particular it can be situated essentially parallel to the windshield on a side of the dashboard support part facing toward the windshield.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to application and uses. Furthermore, there is no intention to be bound by any theory presented in the preceding background or summary or the following detailed description.

Figure 1:
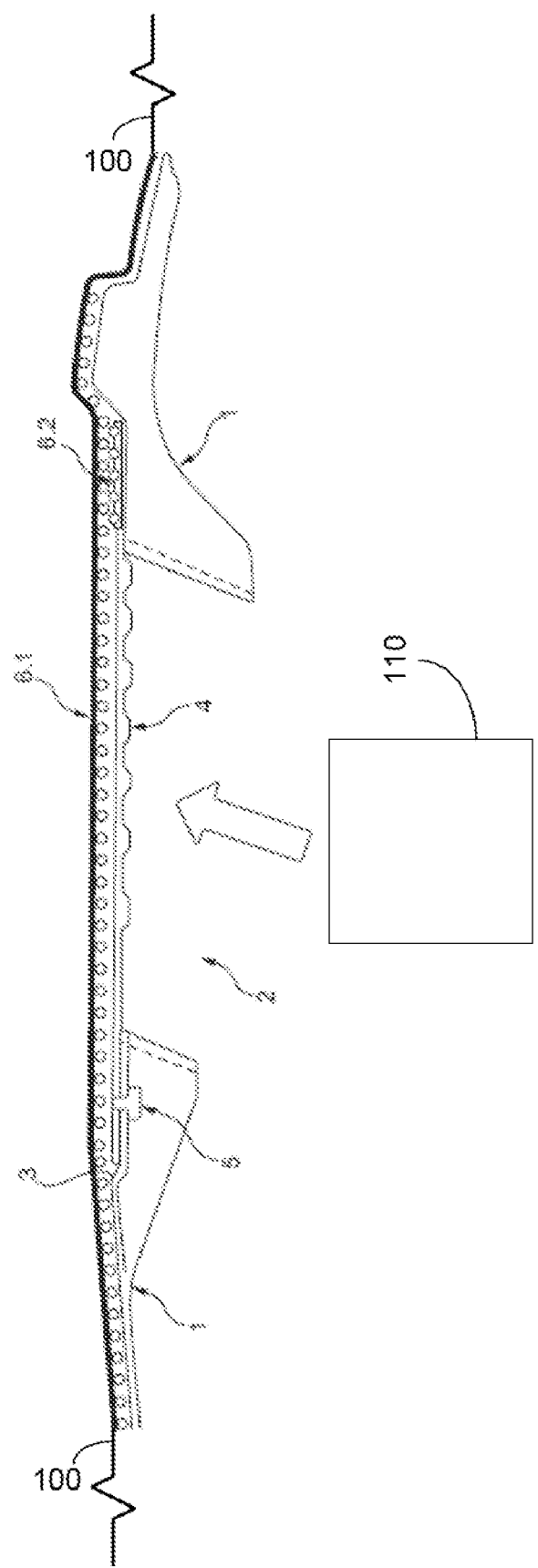
FIG. 1 shows a dashboard support part 1 according to an embodiment of the present invention in cross-section.

FIG. 1 shows a dashboard support part 1 according to an embodiment of the present invention in cross-section. The dashboard support part 1 is fastened using screws on the dashboard of a motor vehicle (not shown).

It has an essentially rectangular (cf. FIG. 2) air bag exit opening 2, through which an unfolding passenger airbag 110 can exit along the firing direction indicated by an arrow in FIG. 1 into the passenger compartment. A passenger airbag module (not shown) is fastened for this purpose on the dashboard support part 1, the dashboard 100, or a part of the vehicle structure, in particular a crossbeam (not shown).

The airbag exit opening 2 is closed by a separate flap 4. For this purpose, the dashboard support part 1 has an annular depression 3 along the circumference of the airbag exit opening 2, which essentially corresponds to the contour of the flap 4 (cf. FIG. 2).

The flap 4 is fastened along a hinge line 5 using blind rivets in this depression 3. Along its remaining circumference, which is U-shaped in the exemplary embodiment, the flap 4 slightly overlaps the airbag exit opening 2 of the dashboard support part 1 and rests in the depression 3, so that it is positively supported on the dashboard support part opposite to the firing direction of the airbag. The flap can be removably fastened on the dashboard support part, in particular by screwing and/or locking as indicated by the dotted line 200 illustrated in FIG. 2. A replacement of the flap is thus advantageously possible, in particular if it has been plastically deformed by the opening passenger airbag as it folds away.

Figure 2:
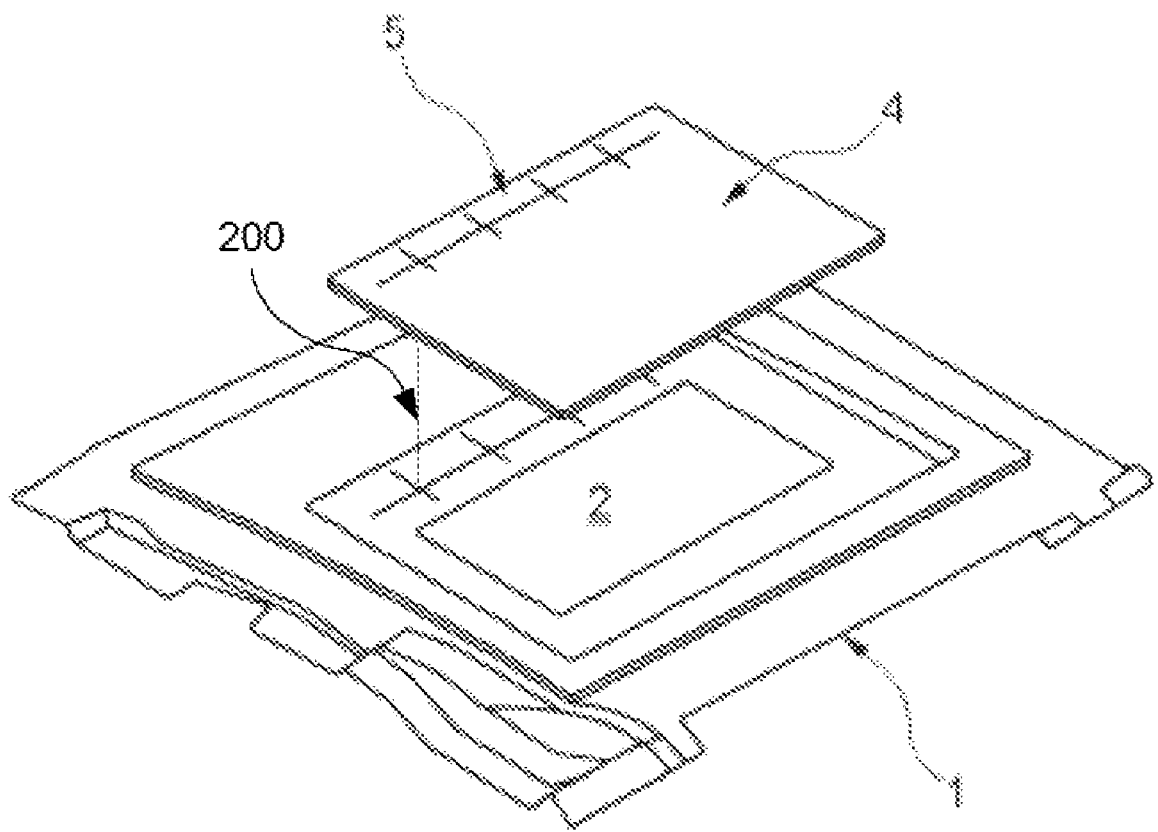
FIG. 2 shows the dashboard support part according to FIG. 1 in a perspective illustration.

Alternatively thereto, the flap can be permanently fastened on the dashboard support part, in particular by welding, gluing, and/or riveting as indicated by the dotted line 200 illustrated in FIG. 2. This allows a particularly simple and reliable connection with little installation effort.

The flap 4 is produced as a thin-walled plastic originally molded part and is flexible in the area of the fastening on the dashboard support part, so that in the event of impingement in the firing direction along a hinge line 5 running essentially through the blind rivets, it may be folded away from the airbag exit opening 2. In this way, a hinge mechanism is implemented, using which the flap 4 is hinged on the dashboard support part 1.

In the area of the flap 4 adjoining the hinge line 5, it is provided with a stiffening structure in the form of transverse ribs, which extend between the contact surfaces, i.e., into the airbag exit opening 2, when the flap 4 is resting in the depression 3 and thus make it more difficult to indent the flap 4 in the direction of the passenger airbag (opposite to the arrow direction in FIG. 1).

On the side facing toward the passenger compartment (on top in FIG. 1), a plastic foam 6.2 is applied for cushioning on the flap 4 and the dashboard support part 1, which is covered by a film 6.1 to protect the plastic foam 6.2. Film 6.1 and plastic foam 6.2 together form a one-piece layer, which forms a continuous surface of the dashboard in the area of the dashboard support part in relation to the passenger compartment. This layer has such a low strength that it can be torn easily by the unfolding air bag and the opening flap 4.

The layer made of film 6.1 and plastic foam 6.2 is applied in the exemplary embodiment after the installation of the passenger airbag module and the dashboard support part 1 so that it covers both the dashboard support part 1 having its flap 4 and also a part of the dashboard surrounding it, on which the dashboard support part is fastened, in one piece using a continuous surface. A continuous and correspondingly easy-to-clean surface results in this way.

In an alteration, the layer comprising the film 6.1 and the plastic foam 6.2 only covers the dashboard support part 1 and the flap 4, so that the dashboard support part 1 having flap 4 fastened thereon can be completely manufactured beforehand and can be replaced easily if needed, in particular after an activation of the passenger airbag.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

The invention claimed is:

1. A dashboard support part for a dashboard of a motor vehicle, comprising:
    an airbag exit opening adapted for unfolding a passenger airbag;
    a flap adapted to close the airbag exit opening, the flap having a first edge and a second edge, the second edge being opposite the first edge;
    a depression adapted to receive the flap;
    the flap being rotatably coupled to the dashboard support part only along a hinge coupled to the first edge of the flap, the hinge configured to couple the flap to the dashboard support part within the depression, wherein the hinge is positioned along one edge of the airbag exit opening and wherein the flap is only rotatably connected to the dashboard support part along the hinge when an airbag is in a folded state;
    a foam layer coving the second edge of the flap; and
    a film layer covering the dashboard support part, the flap, and the foam layer wherein the film layer extends beyond the depression of the dashboard support part; and wherein the film layer is substantially uniform in thickness in a breakaway area.

2. The dashboard support part according to claim 1, wherein the flap is removably fastened on the dashboard support part.

3. The dashboard support part according to claim 2, wherein the flap is removably fastened on the dashboard support part by screwing.

4. The dashboard support part according to claim 1, wherein the film layer covers the dashboard support part in one piece.

5. The dashboard support part according to claim 4, wherein the layer covers the dashboard in one piece.

6. The dashboard support part according to claim 4, wherein the film layer has a continuous surface.

7. The dashboard support part according to claim 4, wherein the film layer comprises a foam film.

8. The dashboard support part according to claim 4, wherein the film layer covers the dashboard in one piece using a continuous surface.

9. The dashboard support part according to claim 1, wherein the flap comprises a stiffening structure on a side facing away from a passenger compartment.

10. The dashboard support part according to claim 9, wherein the stiffening structure is a rib structure.

11. The dashboard support part according to claim 1, wherein the depression is implemented on a side of the dashboard support part facing toward a passenger compartment.

12. The dashboard support part according to claim 1, wherein the depression essentially corresponds to an external contour of the flap.

13. The dashboard support part according to claim 1, wherein the flap is connected to the dashboard support part on a side of the dashboard support part facing a windshield.

14. The dashboard support part according to claim 1, wherein the flap is fastened on the dashboard support part by welding.

15. The dashboard support part according to claim 1, wherein the flap is fastened on the dashboard support part by gluing.

16. The dashboard support part according to claim 1, wherein the flap is fastened on the dashboard support part by riveting.

* * * * *